United States Patent [19]

Vogt et al.

[11] Patent Number: 4,719,196

[45] Date of Patent: Jan. 12, 1988

[54] PROCESS FOR MAKING A CARRIER-SUPPORTED CATALYST

[75] Inventors: Wilhelm Vogt, Hürth; Hermann Glaser, Erftstadt; Eitel Goedicke, Bergheim, all of Fed. Rep. of Germany

[73] Assignee: Hoechst AG, Hürth, Fed. Rep. of Germany

[21] Appl. No.: 903,666

[22] Filed: Sep. 4, 1986

[30] Foreign Application Priority Data

Sep. 18, 1985 [DE] Fed. Rep. of Germany ....... 3533250

[51] Int. Cl.⁴ ...................... B01J 21/04; B01J 23/10; B01J 23/40
[52] U.S. Cl. ................................. 502/304; 502/302; 502/327; 502/332; 502/333; 502/334; 423/213.5
[58] Field of Search .............. 502/302, 304, 327, 332, 502/333, 334; 423/213.5

[56] References Cited

U.S. PATENT DOCUMENTS

| | | | |
|---|---|---|---|
| 3,928,239 | 12/1975 | Yonehara et al. | 502/334 X |
| 4,012,485 | 3/1977 | Meguerian et al. | 502/326 X |
| 4,369,132 | 1/1983 | Kinoshita et al. | 502/333 X |

*Primary Examiner*—W. J. Shine

[57] ABSTRACT

A carrier-supported catalyst is prepared by applying a noble metal on to a ceramic honeycomb structure coated with an aluminum oxide layer. To this end, the ceramic honeycomb structure is impregnated with an aqueous solution containing nitrilotriacetic acid or ethylenediaminotetraacetic acid, ammonia and at least one noble metal compound.

13 Claims, No Drawings

PROCESS FOR MAKING A CARRIER-SUPPORTED CATALYST

This invention relates to a process for making a carrier-supported catalyst by applying one or more noble metals on to a ceramic honeycomb structure coated with an aluminum oxide layer.

British Specification GB-PS No. 1 425 721 describes a process for making a noble metal catalyst, wherein a ceramic honeycomb structure is initially coated with an aluminum oxide layer. Next, the coated honeycomb structure is treated with an ammoniacal solution and then dipped in an impregnating solution made by treating at least one noble metal/chlorine-compound with an aqueous ammoniacal solution at 80°–90° C. The honeycomb structure is ultimately washed, dried and annealed.

This prior process has a disadvantage associated with it, namely that it is invariably necessary for the honeycomb structure coated with the aluminum oxide layer to be dipped over a long period of time, e.g. a day, in the impregnating solution whereas a short-time impregnation in the magnitude of minutes would be desirable for the whole process. As it would appear, the noble metal adsorption by the carrier going beyond that induced by volume impregnation obviously occurs by chemisorption.

It is therefore an object of the present invention to provide a process for making a carrier-supported catalyst by applying one or more noble metals on to a ceramic honeycomb structure permitting the chemisorptive part of the noble metal adsorption by the carrier and the importance which has normally to be attributed to parameters (such as temperature selected for pretreating the carrier, additives and contaminants contained in it, as well as the temperature selected for, and manner of agitating the impregnating solution) to be so reduced that the rate selected for impregnating the carrier can be increased in the absence of whatever adverse effects. To this end, the invention provides for the honeycomb structure to be impregnated with an aqueous solution containing nitrilotriacetic acid or ethylenediaminotetraacetic acid, ammonia and at least one noble metal compound.

Further preferred features of the invention provide:

(a) for the honeycomb structure to be impregnated by continuously flowing the solution through it over a period of up to 60 minutes, preferably up to 5 minutes, and for the honeycomb structure so impregnated to be dried at temperatures within the range 20°–250° C. and heat-treated at temperatures within the range 250°–1000° C., and optionally for the steps of flowing the solution through, and drying and heat-treating, the honeycomb structure to be repeated;

(b) for the impregnating solution used to be one obtained by stirring at least one noble metal compound into an ammoniacal solution of nitrilotriacetic acid or ethylenediaminotetraacetic acid;

(c) for the impregnating solution used to be one obtained by intensively stirring solid nitrilotriacetic acid or ethylenediaminotetraacetic acid into an aqueous solution of at least one noble metal compound, and adding an ammoniacal solution until establishment of a pH of less than 10;

(d) for the aqueous noble metal compound solution to be used in admixture with a salts of at least one rare earth metal;

(e) for the solution to be used in admixture with a cerium salt;

(f) for the solution to be used in admixture with a praseodymium salt;

(g) for the solution to be used in admixture with a salt of a rare earth metal mixture, preferably a didymium salt;

(h) for the aqueous noble metal compound solution to be used in admixture with a zirconium salt;

(i) for the aqueous noble metal compound-solution to be used in admixture with an iron salt;

(j) for the aqueous noble metal compound-solution to be used in admixture with a nickel salt.

In the process of this invention, use is made of an impregnating solution containing the noble metal salt(s) in the form of a complex compound or compounds; the complex formers are selected from substituted acetic acid, preferably from nitrilotriacetic acid and ethylenediaminotetraacetic acid. The molar ratio of noble metal salt to substituted acetic acid in the impregnating solution may vary from 1:1.5–1:4, a molar ratio of 1:2–1:4 being preferably used for nitrilotriacetic acid, and a molar ratio of 1:1.5–1:3 being preferably used for ethylenediaminotetraacetic acid.

The noble metal compounds which should preferably be used in the process of this invention are selected from the chlorides or chloride hydrates or chloroacids of ruthenium, palladium, rhodium, iridium or platinum, e.g. $RuCl_3$, $PdCl_2$, $RhCl_2.4H_2O$, $IrCl_3.3H_2O$, $H_2[PtCl_6].6H_2O$.

The presence of one or more ammonium salts in the impregnating solution enables the chemisorptive part of the noble metal adsorption by the carrier to be further reduced. Apart from those ammonium salts which are forming upon the addition of ammonia to the complex solution to render it alkaline, it is possible for further ammonium salts to be added thereto.

The process of this invention permits the noble metal chemisorption to be completely suppressed in all those cases in which the noble metal complex-solution is used in admixture with one or more additional complexes of the rare earth metals, e.g. in admixture with a 10–16 times molar excess of the nitrilotriacetic acid complex of praseodymium, based on the nitrilotriacetic acid complexes of the noble metals. The strontium complex of nitrilotriacetic acid has also been found to suppress the chemisorption.

In accordance with the process of this invention, the honeycomb structure should suitably be impregnated with the solution containing the noble metal complex compounds at temperatures within the range 0°–100° C., preferably at room temperature.

The carrier-supported catalysts made by the process of this invention can suitably be used in the decontamination of the off-gases of combustion engines and in hydrogenation and isomerization reactions. They are especially efficient in the first of these three fields of application.

EXAMPLE 1 (comparative Example)

Strands about 2.5 cm in diameter made from a cordierite honeycomb structure which was intermediarily provided with 22.3 wgt % γ-aluminum oxide coating, heat-treated at 600° C. and had a BET-surface area of 30 m²/g, were cut into cylinders 3.5 cm long. The cylindrical honeycomb structure so obtained had an average weight of about 11 g and a water absorbing power of 3.5 g. Two impregnating solutions were prepared, namely:

(a) a $H_2[PtCl_6]$-solution containing 6.47 g Pt/l
(b) a $RhCl_3$-solution containing 2.70 g Rh/l 5 cylindrical honeycomb specimens were in each case dipped for variable periods of time in the impregnating solution (cf. Table). The Table shows that the chemisorption failed to be complete even after 24 hours.

TABLE

|  | Cylind. honeycomb | | impreg. solution | |
|---|---|---|---|---|
|  | mg Pt/kg | mg Rh/kg | mg Pt/kg | mg Rh/kg |
| Solut. containing Pt (a) | — | — | 6600 | — |
| Specimen 1 (after 10 s) | 3300 | — | 6100 | — |
| 2 (after 60 s) | 4250 | — | 5500 | — |
| 3 (after 15 min) | 5550 | — | 4950 | — |
| 4 (nach 60 min) | 6250 | — | 4550 | — |
| 5 (after 24 h) | 7300 | — | 3950 | — |
| Solut. containing Rh (b) | — | — | — | 1200 |
| Specimen 1 (after 10 s) | — | 650 | — | 1050 |
| 2 (after 60 s) | — | 900 | — | 950 |
| 3 (after 15 min) | — | 2000 | — | 600 |
| 4 (after 60 min) | — | 2750 | — | 350 |
| 5 (after 24 h) | — | 3350 | — | 100 |

EXAMPLE 2 (invention)

An aqueous solution of $H_2[PtCl_6]$ and $RhCl_3$ in the molar ratio Pt:Rh=5:1 was stirred into an ammoniacal solution of nitrilotriacetic acid (NTA). A clear light yellow solution containing (Pt+Rh) and NTA in a molar ratio of 1:2 was obtained, the whole was diluted and an impregnating solution containing 3200 g Pt and 640 g Rh per liter was obtained.

A cordierite honeycomb structure with a volume of 1.24 l, which was intermediarily provided with a 22.3 wgt % γ-aluminum oxide coating, heat-treated at 600° C., and had a BET-surface area of 30 m²/g was impregnated by continously flowing 2 l impregnating solution through it over a period of 1 minute. The solution then still contained 3070 g Pt/l and 560 mg Rh/l.

As results, the solution showed a reduction of 130 mg Pt/l and 80 mg Rh/l, due to chemisorption.

EXAMPLE 3 (invention)

An aqueous solution of $H_2[PtCl_6]$, $RhCl_3$ and $Ce(NO_3)_3$ in a weight ratio of Pt:Rh:Ce=5:1:32 was stirred into an ammoniacal solution of nitrilotriacetic acid which had a pH of 10. The pH was maintained constant by continuously adding ammonia, the molar ratio of (Pt+Rh+Ce):NTA being 1:2. The whole was diluted with water and an impregnating solution containing 5000 mg Pt, 1000 mg Rh and 32,500 mg Ce per liter was obtained.

A honeycomb structure of the kind used in Example 1 was impregnated by flowing 2 l impregnating solution through it over a period of 1 minute. The metal concentration in the impregnating solution so used could not be found to have been reduced.

EXAMPLE 4 (invention)

An impregnating solution containing 3150 mg Pt, 625 mg Rh and 36,500 mg Pr per liter was prepared as described in Example 3.

A honeycomb structure was impregnated by continuously flowing the solution through it; the metal concentration of the impregnating solution so used could not be found to have been reduced.

EXAMPLE 5 (invention)

Example 4 was repeated with that modification however that the nitrilotriacetic acid was replaced by ethylenediaminotetraacetic acid (EDTA); the molar ratio (Pt+Rh+Pr):EDTA was 1:1.5.

A honeycomb structure was impregnated by continuously flowing the solution through it; the metal concentration of the impregnating solution so used could not be found to have been reduced.

EXAMPLE 6

305 g free nitrilotriacetic acid was stirred into a solution of 30.3 g $H_2[PtCl_6]$, 6.38 g $RhCl_3$ and 448.38 g $Zr(NO_3)_4$ in 1.3 l water; next, a concentrated ammoniacal solution was added dropwise until all was found to have been dissolved. A pH of 10 was established in the clear ammoniacal solution by continuing the addition of ammonia and diluted with water to a volume of 2 liters. The clear light yellow impregnating solution so obtained contained 6.06 g Pt, 1.21 g Rh and 44.8 g $ZrO_2$ per liter. A honeycomb structure which was coated with 120 g aluminum oxide, had a total weight of 650 g and a water absorbing power of 120 g was impregnated by continuously flowing the impregnating solution through it; the structure so treated contained 0.72 g Pt, 0.15 g Rh and 5.37 g $ZrO_2$. Next, it was dried at temperatures of up to 250° C. and heat-treated at 550° C.

The steps of impregnating, drying and heat-treating were repeated using the same solution; it was possible for the quantity of metal applied to the honeycomb structure to be multiplied integrally.

EXAMPLE 7 (invention)

Example 6 was repeated with that modification however that the impregnating solution was prepared using 350 g ehylenediaminetetraacetic acid which replaced the nitrilotriacetic acid.

The composition and properties of the resulting catalyst remained practically unchanged.

EXAMPLE 8 (invention)

352 g solid nitrilotriacetic acid was stirred into an aqueous solution of 143.6 g $Ce(NO_3)_3.3H_2O$, 320.0 g $Zr(NO_3)_4$, 22.03 g $H_2[PtCl_6]$ and 4.65 g $RhCl_3$; next, ammonia was added until all was found to have dissolved. A pH of 10 was established by adding further aqueous ammonia and the whole was made up to 2 l. The clear yellowish impregnating solution contained 4.41 g Pt, 0.88 g Rh, 32.0 g $ZrO_2$ and 28.5 g $CeO_2$ per liter.

1.45 g Pt, 0.29 g Rh, 0.9% Ce and 0.9% Zr were applied to a honeycomb structure, which had a total weight of 850 g, a volume of 1.24 l, was coated with 18% aluminum oxide and had a water absorbing power of 165 g, by continuously flowing twice, each time for 1 minute, the impregnating solution through the honeycomb structure, intermediarily drying the latter at 250° C. and heat-treating it at 550° C.

EXAMPLE 9 (invention)

580 g nitrilotriacetic acid was stirred into an aqueous solution of 178 g $Fe(NO_3)_3.9H_2O$, 172 g $Ce(NO_3)_3.6H_2O$, 382 g $Zr(NO_3)_4$, 27.96 g $H_2[PtCl_6]$ and 5.91 g $RhCl_3$; next, a concentrated aqueous ammoniacal solution was added until a pH of 10 was obtained. The impregnating solution was made up to 2 l. 1.45 g Pt, 0.29 g Rh, 0.9% Ce, 0.9% Zr and 0.4% Fe were applied to a honeycomb structure which had a total weight of 800 g, was coated with 16% aluminum oxide and had a water absorbing power of 130 g, by continuously flowing twice, each time for 1 minute, the impregnating solution through the honeycomb structure, intermediarily drying the latter at 250° C. and heat-treating it at 600° C.

EXAMPLE 10 (invention)

430 g nitrilotriacetic acid was introduced into an aqueous solution the same as that used in Example 9 save that it was free from cerium nitrate and a concentrated aqueous ammoniacal solution was added until a clear solution with a pH of 10 was obtained. The impregnating solution so prepared was made up to 2 l.

A honeycomb structure the same as that used in Example 9 was impregnated as described in that Example. The resulting carrier-supported catalyst contained 1.45 g Pt, 0.29 g Rh, 0.9% Zr and 0.4% Fe.

EXAMPLE 11 (invention)

630 g nitrilotriacetic acid was stirred into an aqueous solution of 171 g $Ce(NO_3)_3.6H_2O$, 178 g $Fe(NO_3)_3.9H_2O$, 213 g $Ni(NO_3)_2.6H_2O$, 27.96 g $H_2[PtCl_6]$ and 5.91 g RhCl; next, ammonia was added until all was found to have been dissolved and the pH was 10.

A honeycomb structure the same as that used in Example 9 was impregnated as described in that Example. The resulting carrier-supported catalyst contained 1.45 g Pt, 0.29 g Rh, 0.9% Ce, 0.4% Fe and 0.7% Ni.

EXAMPLE 12 (invention)

430 g solid nitrilotriacetic acid was stirred into an aqueous solution of 171 g $Ce(NO_3)_3.6H_2O$, 382 g $Zr(NO_3)_4$, 14 g $H_2[PtCl_6]$ and 28 g $PdCl_2$; next, a concentrated aqueous ammoniacal solution was added until all was found to have been dissolved and the pH was 10.

A honeycomb structure the same as that used in Example 9 was impregnated as described in that Example. The resulting carrier-supported catalyst contained 0.72 g Pt, 0.72 g Pd, 0.9% Ce and 0.9% Zr.

We claim:

1. A process for making a carrier-supported catalyst by applying a noble metal selected from the group consisting of ruthenium, palladium, rhodium, iridium and platinum on to a ceramic honeycomb structure coated with an aluminum oxide layer which comprises: impregnating the honeycomb structure by continuously flowing an aqueous solution containing a substituted acetic acid selected from the group consisting of nitrilotriacetic acid and ethylenediaminotetraacetic acid, ammonia and at least one noble metal compound therethrough over a period of up to 60 minutes, and drying the honeycomb structure so impregnated at temperatures within the range 20° to 250° C. and heat-treating it at temperatures within the range 250° to 1000° C.

2. The process as claimed in claim 1, wherein the honeycomb structure is impregnated by flowing the solution therethrough over a period of 5 minutes.

3. The process as claimed in claim 1, wherein the impregnating solution used is one obtained by introducing while stirring at least one noble metal compound into an ammoniacal solution of a substituted acetic acid selected from the group consisting of nitrilotriacetic acid and ethylenediaminotetraacetic acid.

4. The process as claimed in claim 1, wherein the impregnating solution used is one obtained by introducing with intense agitation a substituted acetic acid selected from the group consisting of nitrilotriacetic acid and ethylenediaminotetraacetic acid into an aqueous solution of at least one noble metal compound, and adding an ammoniacal solution until establishment of a pH value of less than 10.

5. The process as claimed in claim 1, wherein the aqueous noble metal compound solution is used in admixture with at least one rare earth metal salt.

6. The process as claimed in claim 5, wherein the solution is used in admixture with a cerium salt.

7. The process as claimed in claim 5, wherein the solution is used in admixture with a praseodymium salt.

8. The process as claimed in claim 5, wherein the solution is used in admixture with a salt of a rare earth mixture.

9. The process as claimed in claim 8, wherein the solution is used in admixture with a didymium salt.

10. The process as claimed in claim 1, wherein the aqueous noble metal compound solution is used in admixture with a zirconium salt.

11. The process as claimed in claim 1, wherein the aqueous noble metal compound solution is used in admixture with an iron salt.

12. The process as claimed in claim 1, wherein the aqueous noble metal compound solution is used in admixture with a nickel salt.

13. The process as claimed in claim 1, wherein the heat-treated honeycomb structure is at least once again impregnated, dried and heat-treated.

* * * * *

UNITED STATES PATENT AND TRADEMARK OFFICE
CERTIFICATE OF CORRECTION

PATENT NO. : 4,719,196

DATED : January 12, 1988

INVENTOR(S) : Wilhelm Vogt, Hermann Glaser, Eitel Goedicke

It is certified that error appears in the above-identified patent and that said Letters Patent is hereby corrected as shown below:

On the Title Page:

The recitation of the residence and principal place of business of Hoechst AG in the Code [73] item on the coversheet of the patent (presently "Hürth") should read:

--Frankfurt/Main--

Signed and Sealed this

Seventh Day of February, 1989

*Attest:*

DONALD J. QUIGG

*Attesting Officer*  Commissioner of Patents and Trademarks